United States Patent
Jain

(10) Patent No.: US 9,280,785 B1
(45) Date of Patent: Mar. 8, 2016

(54) ALLOCATING OFFLINE ADVERTISING INVENTORY

(75) Inventor: Amit Jain, Irvine, CA (US)

(73) Assignee: Google Inc., Mountain View, CA (US)

( * ) Notice: Subject to any disclaimer, the term of this patent is extended or adjusted under 35 U.S.C. 154(b) by 1310 days.

(21) Appl. No.: 12/348,260

(22) Filed: Jan. 2, 2009

(51) Int. Cl.
*G06Q 30/00* (2012.01)
*G06Q 30/02* (2012.01)

(52) U.S. Cl.
CPC ........ *G06Q 30/0243* (2013.01); *G06Q 30/0201* (2013.01)

(58) Field of Classification Search
CPC combination set(s) only.
See application file for complete search history.

(56) References Cited

U.S. PATENT DOCUMENTS

| | | | |
|---|---|---|---|
| 7,505,920 B2 * | 3/2009 | Agarwal et al. | 705/14.73 |
| 2003/0135460 A1 * | 7/2003 | Talegon | 705/40 |
| 2005/0203796 A1 * | 9/2005 | Anand et al. | 705/14 |
| 2009/0030780 A1 * | 1/2009 | York et al. | 705/10 |
| 2009/0076890 A1 * | 3/2009 | Dixon et al. | 705/10 |
| 2009/0144144 A1 * | 6/2009 | Grouf et al. | 705/14 |
| 2011/0029373 A1 * | 2/2011 | Steelberg et al. | 705/14.41 |

* cited by examiner

*Primary Examiner* — Ryan Zeender
*Assistant Examiner* — Christopher Buchanan
(74) *Attorney, Agent, or Firm* — Fish & Richardson P.C.

(57) ABSTRACT

A computer-implemented method of allocating offline advertising, the method including receiving an offer price for audience-member responses for an offline advertising campaign and campaign information describing the offline advertising campaign, comparing the received campaign information to one or more other advertising campaigns to determine a portion of offline advertising inventory to allocate to the offline advertising campaign, and allocating the determined portion of advertising inventory to the offline advertising campaign.

25 Claims, 7 Drawing Sheets

US 9,280,785 B1

ALLOCATING OFFLINE ADVERTISING INVENTORY

TECHNICAL FIELD

This document generally describes allocating offline advertising inventory to offline advertising campaigns such as those appearing on television, radio and in print.

BACKGROUND

Advertisements can be included in various forms of offline media. For example, offline ads, such as broadcast on radio, can be a powerful way for advertisers to reach an audience. Members of the audience can be influenced, e.g., to make purchases, investigate products or use services that are advertised. Offline media providers, such as radio stations and newspapers, can make advertising inventory available to advertisers. Advertising inventory can include advertising spots (e.g., 30-second time slots in a radio broadcast or parts of a newspaper page) and can be allocated to advertising campaigns. Allocating can include scheduling and reserving the spot for a particular campaign. An advertising campaign can be a comprehensive advertising plan that consists of a series of messages published or broadcast in a variety of media over a specific time frame. Advertisers can create campaigns that center on a single theme or idea, such as to promote a product or service. The campaign messages, sometimes called "creatives," can be media content such as recorded audio or video. The campaign messages can be referred to generically as advertisement messages or simply as advertisements.

SUMMARY

This document describes techniques for allocating offline advertising inventory. In general, advertising inventory can be allocated to an offline advertising campaign based on comparing the campaign to other offline advertising campaigns.

In one implementation, the described subject matter in this specification can be a computer-implemented method of allocating offline advertising, the method including receiving an offer price for audience-member responses for an offline advertising campaign and campaign information describing the offline advertising campaign; comparing the received campaign information to one or more other advertising campaigns to determine a portion of offline advertising inventory to allocate to the offline advertising campaign; and allocating the determined portion of advertising inventory to the offline advertising campaign. Other implementations of this aspect include corresponding systems, apparatus, and computer program products.

These and other implementations can optionally include one or more of the following features. The received campaign information can include price, target audience and category details of an advertising offering of the offline advertising campaign. The received campaign information can include a past response rate for the offline advertising campaign. The received campaign information can include an estimated number of audience members. The audience-member responses can include mobile device responses. Comparing can include predicting a number of the audience-member responses based on the campaign information. Comparing the campaign information to other advertising campaigns can include using similar information for the other advertising campaigns as the campaign information.

These and other implementations can also optionally include one or more of the following features. Some implementations can include comparing the offer price to offer prices of the other advertising campaigns so that the determined portion is favorable for the offline advertising campaign when either the offer price compares favorably to the offer prices of the other advertising campaigns or the campaign information compares favorably to the other advertising campaigns. The determined portion being favorable can include being beneficial to an objective relating to the offline advertising campaign. Some implementations can include providing updates, relating to the allocating, through a user interface in substantially real time. Some implementations can include broadcasting an advertisement from the offline advertising campaign to an audience. Some implementations can include receiving an amount of audience member responses to the broadcast advertisement and charging for the broadcasting based on the amount and the offer price. The offline advertising can be conducted using one or more of broadcast radio, television or a newspaper.

The details of one or more implementations are set forth in the accompanying drawings and the description below. Other features, aspects, and advantages of the subject matter will be apparent from the description and drawings, and from the claims.

DESCRIPTION OF DRAWINGS

Like reference symbols in the various drawings indicate like elements.

DETAILED DESCRIPTION

Figure 1:
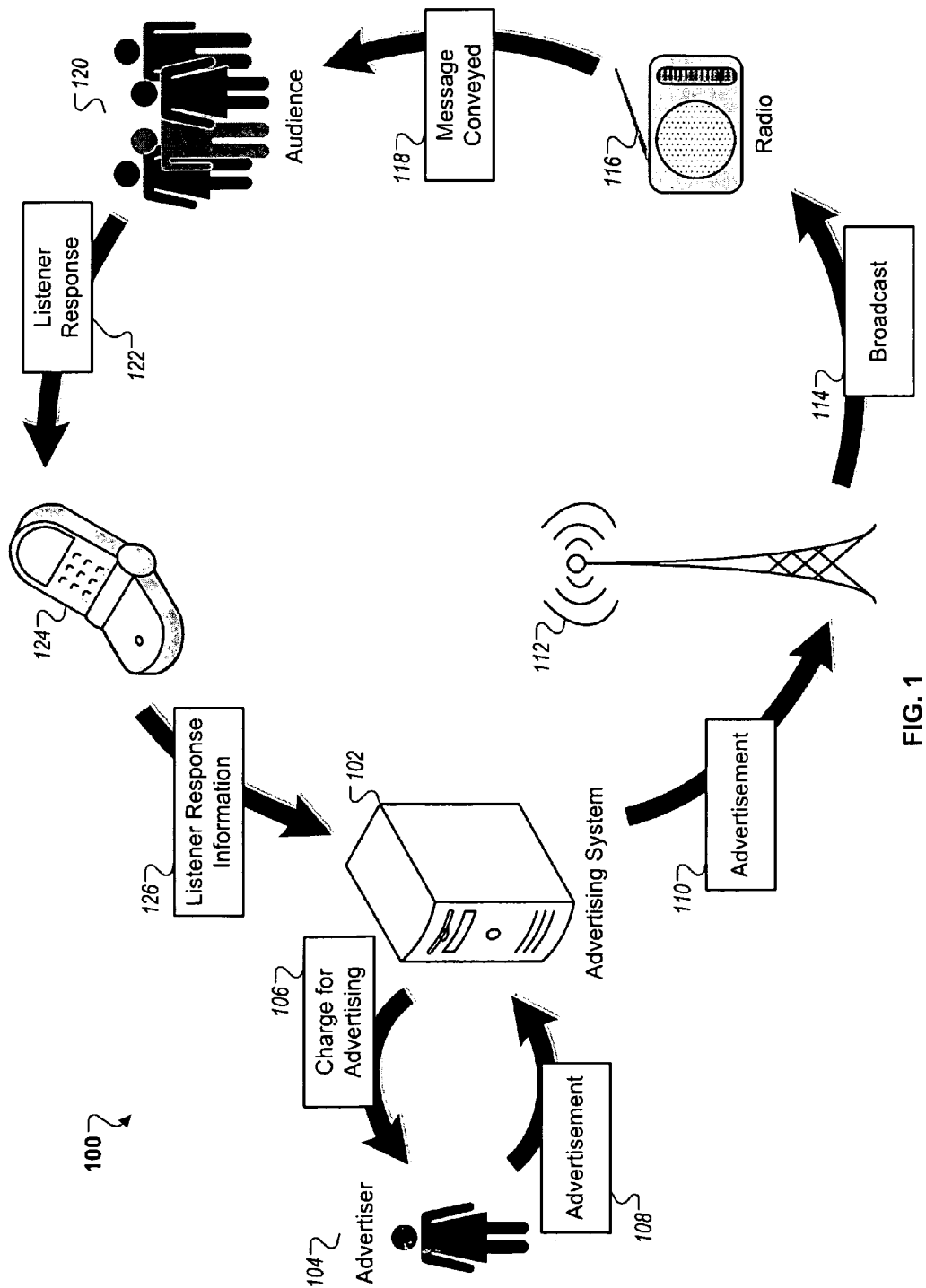
FIG. 1 is a diagram showing an exemplary overview of offline advertising.

In general, this document describes allocating offline advertising inventory. Offline advertising can refer to advertising taking place through media channels other than the World Wide Web (e.g., advertising on radio and television stations, in newspapers, or through mail or email). An advertiser can provide campaign information and offer to pay a particular amount for each response generated by a campaign (e.g., making a purchase online or in a store, requesting additional information over the phone, visiting a retail store or website, sending a text message). Because the demand for particular advertising inventory may exceed available inventory, decisions can be made regarding how to allocate the available inventory to the campaigns. When inventory is allocated to a campaign, campaigns advertisements can be, e.g., broadcast or displayed according to the allocation. For example, a 30-second slot in a radio station's morning drive program can be allocated to a campaign advertising an upcoming television show. When the broadcast time arrives for the 30-second slot, a campaign advertisement giving the TV show's premise and program information can be broadcast.

Inventory can be allocated to ongoing campaigns with historical data detailing the campaign's past performance or new campaigns without historical data. Campaign performance can be measured, e.g., as a response rate. A response rate can be the number of people out of a total number of audience members receiving a campaign message that are influenced to respond by the message. The response can include making a purchase, visiting a business or using a service. These responsive acts can be performed, e.g., in person, online (e.g., via the Internet or other packet-switched data network) or over the phone. The acts can be tracked so that providers of advertising inventory (e.g., broadcasters) or advertisers (e.g., companies with advertising campaigns) are able to monitor campaign response rates.

Allocating advertising inventory to campaigns without performance histories can include using what is known about a campaign to predict how well the campaign will perform. For example, a product being advertised through a campaign may be known to be very popular. Knowing what product will be advertised and that the product is popular can enable a prediction to be made that the campaign will perform well relative to other campaigns advertising less popular products.

Advertising inventory can be also be allocated to campaigns having historical performance data. Based on the historical data and other campaign information a prediction can be made regarding how well the campaign will perform given a potential inventory allocation. A quality assessment can be established based on the prediction and other factors. A campaign having a high quality assessment can be preferred in allocating inventory over a campaign having a low quality assessment.

Furthermore, a campaign having a high quality assessment and a relatively low offer amount per response can receive a similar allocation preference to a campaign having a low quality assessment and a relatively high offer amount per response. Both campaigns can generate the same amount of revenue for the broadcaster. For example, a campaign predicted to receive 1,000 responses at $1 per response can generate the same amount as a campaign predicted to receive 250 response at $4 per response. Many other factors can be used to determine the allocation besides the offer amount and response rates such as the effective cost per thousand impressions (CPM), calculated based on an estimate of the size of the audience and total revenue expected, market saturation, product type and other factors.

Advantageously, the described subject matter may provide for one or more of the following potential benefits. A low risk advertising solution can be created for advertisers in which no charge is made for advertising that generates no responses. Smaller advertisers with small advertising budgets who find it difficult and risky to buy offline advertising can try offline advertising with little or no risk. Broadcasters can also maximize the value of advertising inventory when the inventory is allocated either to campaigns that are likely to generate many responses or campaigns offering a relatively high amount per response. Advertisers can be required to continually improve their advertising campaigns to be more effective or raise the amount of the response offer. The approach in offline media selling can create new incentives for advertisers to make their campaigns perform better than other campaigns. Better performing campaigns can pay less per response.

The described subject matter may also provide for one or more of the following potential benefits. An advertiser can know a campaign's relative performance in an advertising marketplace by the cost per response. The increased competition can improve the overall value of the inventory available. Advertisers lacking the ability to track the performance of their campaigns can gain awareness of which portion of their budget is producing the best results. A method including charging for responses can provide an advertiser performance tracking of the campaign. Performance tracking can provide information that enables advertisers to improve the return on their budgets and effectively allocate the budgets.

FIG. 1 is a diagram 100 showing an exemplary overview of offline advertising. To achieve an advertising objective (e.g., selling a product) an advertiser, or the advertiser's agent, can create advertisements as part of an advertising campaign. The advertisement can be broadcast by a radio station to a large audience. Some portion of the audience can respond to the advertisement by, e.g., making a phone call. The responses can be tracked and the advertiser can be charged based on the responses.

The advertiser 104 is an entity having an advertising objective. The advertising objective can be to influence people to respond, such as to buy a product, use a service or finding out more about a product or service. The advertiser 104 can be an individual, group or company that, e.g., wants to sell a product. The advertiser 104 can also be an advertising agency that represents and creates advertising campaigns for others.

The advertiser 104 can have an advertising campaign including an advertisement 108. The advertisement 108 can include a message designed to further the advertiser's 104 objectives. For example, the advertisement 108 can be an audio recording of actors describing the beneficial aspects of a product. The advertisement 108 can also be print media or other offline advertisement. The advertiser 104 can communicate with an advertising system 102.

The advertising system 102 allocates advertising inventory to an advertising campaign. The advertising system 102 can be a computer system including, e.g., one or more computing platforms, storage devices, user interfaces and network connections. The advertising system 102 can include a system or a connection to a system for charging advertisers. The advertising system 102 can store a received advertisement 108 and then communicate the advertisement 110 to a broadcast entity 112. The advertising system 102 can include a database where advertising media is stored.

The broadcast entity 112 communicates with an audience. The broadcast entity 112 can be a radio station with terrestrial broadcast equipment. The broadcast entity 112 can also include satellite broadcast equipment. The broadcast entity 112 can also be, e.g., a newspaper publisher or television broadcast station. The broadcast entity 112 can transmit a broadcast 114.

The broadcast 114 is a message that can be received. The broadcast 114 can be signals transmitted through the air or over wires, or a palpable product. The signals can be radio signals communicating audio and other content. The signals can also be television signals sent through the air or over cable communicating audiovisual content. The palpable product can be a newspaper or other printed material.

A radio 116 deciphers and makes transmitted content perceptible. The radio 116 can be an FM (frequency modulation) radio. The radio 116 can also be a satellite radio. The radio 116 can decipher analog or digital radio signals. The radio 116 can include an amplifier and speaker to make content audible.

The audible content can include a message conveyed 118. The message conveyed 118 is an attempt to communicate and can include, e.g., speech, music and sound effects that convey the message 118. The message conveyed 118 can attempt to influence an audience 120.

The audience 120 is a group of people. The audience 120 can be located within a particular geographic region (e.g., a city or part of a city) or widely distributed (e.g., across a state, country or planet). The audience 120 can be include many subgroups and individuals. The audience 120 can correspond to one or more metropolitan areas, designated market areas, cities or zip codes. A designated market area (DMA) can be an area used by a media research group to identify broadcast stations whose broadcast signals reach specific geographic areas and attract the most viewers. A DMA may not overlap other DMAs.

A listener response 122 is a response performed by a member of the audience 120. The response 122 can include making a purchase, using a service, or otherwise responding. For example, the response 122 can be dialing a phone number, sending a SMS (short message service) message from a mobile device, sending an email, visiting a website, visiting a store, etc.

The mobile phone 124 is an electronic device used for mobile voice or data communication. The communication can be via a network of base stations (e.g., cell sites). The mobile phone 124 can support many services such as SMS for text messaging, email, and packet switching for access to the Internet.

The listener response information 126 is information about a response performed. The information 126 can include, e.g., a date and time a telephone call was made to a tracked telephone number, an SMS message was sent, or a tracked URL (uniform resource locator) was requested.

In operation, the advertiser 104 provides the advertisement 108 to the advertising system 102. The received advertisement 108 can be associated with an advertising campaign. The advertising system 102 can allocate advertising inventory for a campaign. At the time or place indicated by the allocation, the advertisement 110 can be transmitted to a broadcast entity 112 for broadcast. The broadcast entity 112 can transmit the broadcast 114 to a radio 116. The radio 116 can play the broadcast 114 so it is audible to the audience 120. Through the radio 116, the message 118 is conveyed to the audience 120 by the advertiser 104. Some listeners in the audience 120 on receiving the conveyed message 118 can be influenced to respond 122. The listener response 122 can involve the use a device such as a mobile phone 124 to send an SMS message, email or make a phone call. When the response 122 is performed on the device 124, listener response information 126 is transmitted to the advertising system 102 for tracking. Based on the listener response information 126, such as the number of phone calls received, the advertising system 102 charges the advertiser 104 for the advertising.

Figure 2:
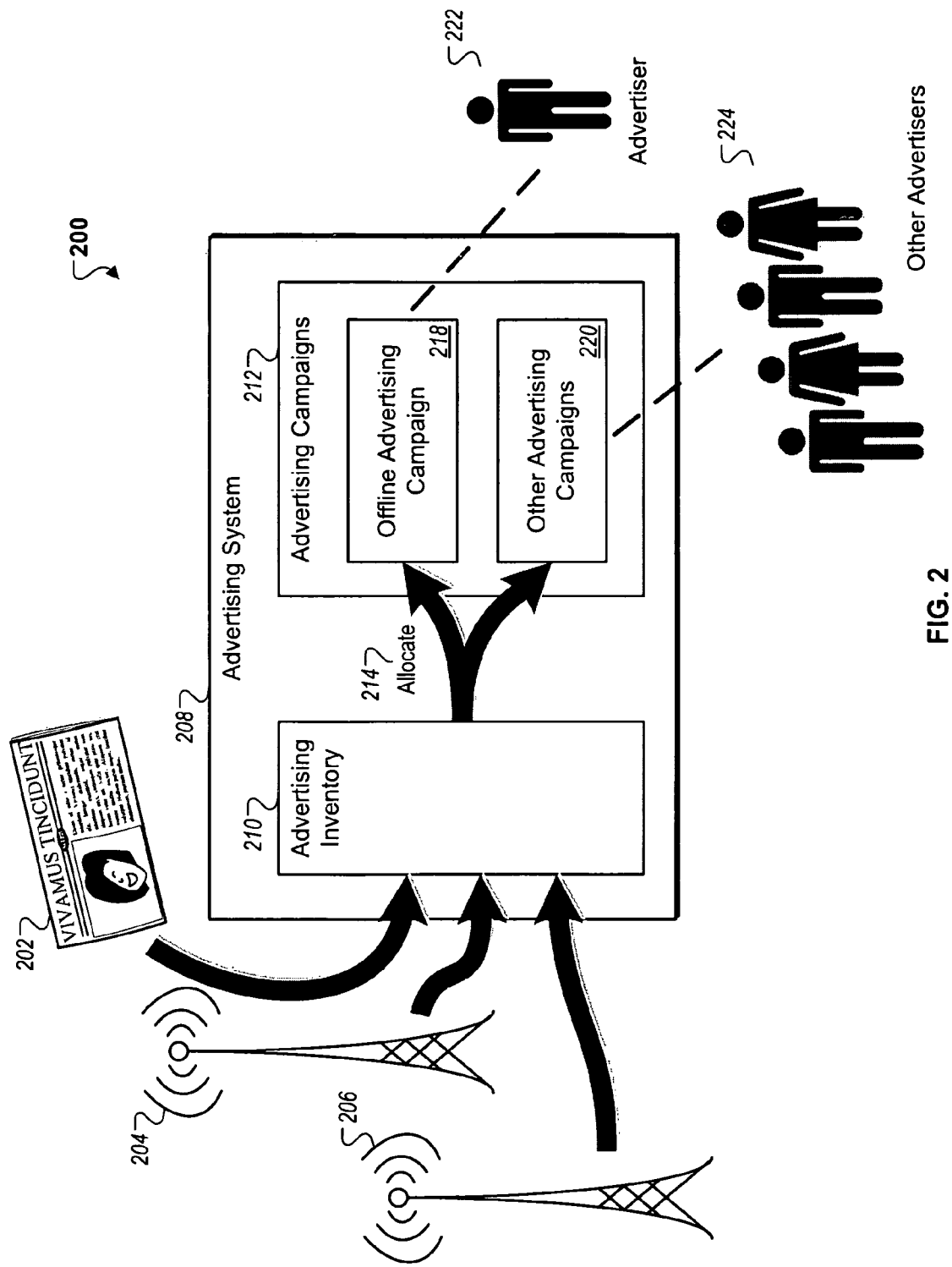
FIG. 2 is a diagram showing allocation of offline advertising inventory.

FIG. 2 is a diagram 200 showing allocation of offline advertising inventory. Media providers, such as radio and television stations, and newspapers, can include advertisements with the media they provide. The spots or places available for advertising within the media, or advertising inventory, from several providers can be allocated using an advertising system to advertising campaigns.

A newspaper publisher 202 has advertising space within the pages of a newspaper. The newspaper publisher 202 can also include, e.g., news, sports and financial information in its publication. The advertising space can be very small, such as a classified ad having few words, or cover an entire page. Print advertisements in a newspaper can include text or graphics in color or black and white. A newspaper can include different sizes of advertising spaces and many advertising spaces.

A radio broadcaster 204 transmits a radio program to an audience of listeners. The radio program can include music and speech. Advertisements can play between songs, for example, or at periodic intervals during a talk-show program.

A television broadcaster 206 transmits audio and video to an audience. The television programs can include shows, movies, and many information and entertainment options. Advertisements can be aired at intervals in a program instead of the program or while a program is playing (e.g., product placement or small graphics overlaid on the program content at the bottom of the video content).

An advertising system 208 has access to advertising inventory 210 and advertising campaigns 212. The advertising system 208 can be a computer system including, e.g., one or more computing platforms, storage devices, user interfaces and network connections. The advertising system 208 can provide interfaces for media providers 202, 204 and 206 as well as advertisers 222 and 224.

The advertising inventory 210 is an inventory of advertising options available from media providers 202, 204 and 206. The advertising inventory 210 can include inventories from one or more media providers. The advertising inventory 210 can include all the advertising available from a given media provider or portion of the total advertising. The advertising inventory 210 can include, for example, a list of time slots, spots, or spaces media providers 202, 204 and 206 have set aside for allocation by the advertising system 208.

Advertising campaigns 212 are represented within the advertising system 208. Information about the advertising campaigns 212 can be stored such as the advertisements, time period and budget associated with the campaigns 212.

The advertisers 222 and 224 an entities having an advertising objective. The advertising objective can be to influence people to respond, such as to buy a product, use a service or finding out more about a product or service. The advertisers 222 and 224 can be individuals, groups or companies that, e.g., want to sell a product. The advertisers 222 and 224 can also be an advertising agency that represents and creates advertising campaigns for third parties.

In operation, the advertising system 208 can include an inventory-management module that allocates available advertising inventory to advertising campaigns. The media providers 202, 204 and 206 can make a portion or all of their advertising space or slots available to the advertising system 208. The advertising system 208 can maintain an inventory 210 of the advertising options. By analyzing an offline advertising campaign 218, the advertising system 208 can determine which portion of the inventory 210 to allocate to the campaign 218. The advertising system 208 can also compare a campaign 218 to other campaigns 220 within the system 208 to determine what inventory 210 to allocate to the various campaigns 212.

Figure 3:
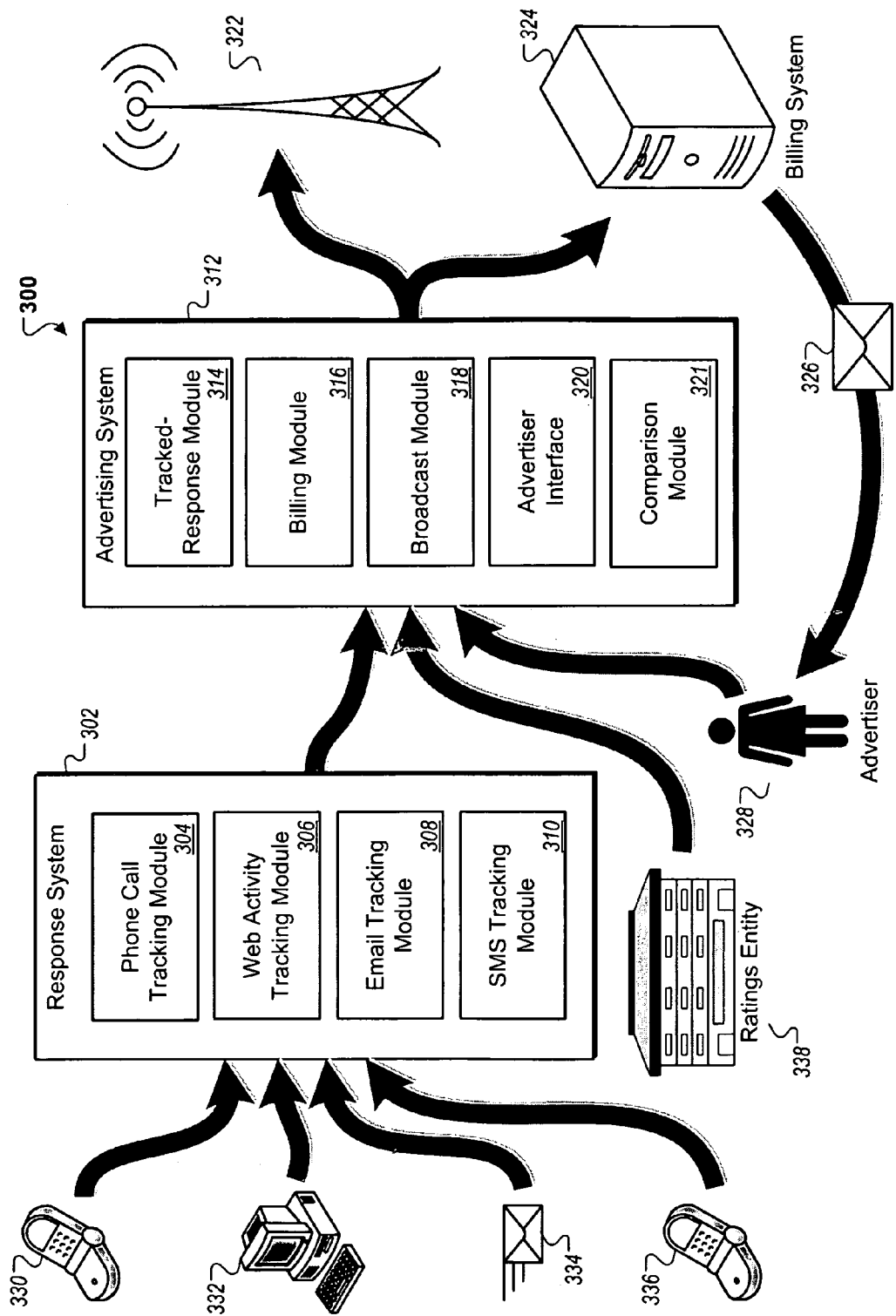
FIG. 3 is a diagram of a system for allocating offline advertising inventory.

FIG. 3 is a diagram 300 of a system for allocating offline advertising inventory. Various types of responses to advertisements can be tracked. The response information, ratings information (e.g., estimates of the number of listeners to a given station at a given time of day), and information provided by advertisers can be used by an advertising system to allocate advertising inventory. The allocation of inventory can ultimately affect which campaigns are broadcast and billed as a result.

The mobile phone 330 is a mobile device for making a phone call. The phone 330 can allow a person to dial a telephone number, connect to the phone number and communicate orally. The phone 330 can also be a wired or wireless phone connected to a standard telephone system (non-cellular). The phone 330 can be a dedicated phone or one of many devices having phone-like capabilities.

The personal computer 332 is used by a person to access the Internet. The computer 332 can be a desktop or laptop computer connected to a network. The computer 332 can include a browser for accessing and displaying web sites on the World Wide Web. The browser can provide a place where a user can enter a URL for web site and then be taken to the website. Through the website a user can make purchases, request information or simply access information.

The email device 334 is used to send email to an addressee. The email device 334 can be a computer, such as the personal computer 332, or a mobile device, such as the mobile phone 330. The email device 334 can communicate using the appropriate protocols so that an email message, or email, is transmitted and received at the intended destination.

The mobile device 336 is a device capable of sending short text messages using SMS to various recipients. Recipients can be individuals or entities, such as companies or responsive robots.

The response system 302 is a system capable of receiving information tracking advertising responses. The system 302 can be a single system or many separate systems. The system 302 can be in one location or various locations. The system 302 can be administered by multiple entities with information about the response activities being passed between the entities. The system 302 is also capable of communicating the response information. The system 302 can organize the response information in a database and provide the information through a specification such as XML (extensible markup language).

The phone call tracking module 304 tracks calls made to particular numbers. A phone number can be setup in the module 304 so that whenever the number is called, the module 304 stores information about the call (e.g., time, date, phone number of caller, number called). In addition, one module 304 can be configured to receive information on many different phone numbers. The module 304 can track calls made to numbers even when the ultimate destination for the call is not the module 304.

The web activity tracking module 306 tracks requests made for particular URLs. A URL can be setup in the module 306 so that whenever the URL is requested, the module 306 stores information about the request (e.g., time, date, IP (Internet protocol) address of requester, URL requested). In addition, one module 306 can be configured to receive information on many different URLs. The module 306 can track requests made to URLs even when the ultimate destination for the request is not the module 306. This can be accomplished, for example, using JavaScript code on an website to communicate tracking information to the module 306.

The email tracking module 308 tracks emails sent to particular email addresses. An email address can be setup in the module 308 so that whenever a message is sent to the address, the module 308 stores information about the received message (e.g., time, date, email address of sender, address sent to). In addition, one module 308 can be configured to receive information on many different email addresses. The module 308 can track messages sent to addresses even when the ultimate destination for the message is not the module 308.

The SMS tracking module 310 tracks text messages sent to particular recipients. The module 310 can be setup so that whenever a message is sent to a recipient, the module 310 stores information about the received message (e.g., time, date, sender, recipient). In addition, one module 310 can be configured to receive information on many different text message recipients. The module 310 can track messages sent to recipients even when the ultimate destination for the text message is not the module 310.

The ratings entity 338 provides information about media provider audiences. The information can include an estimate of the people in an audience at a given time of time, the ages of the people and geographic regions represented by the audience. For example, Arbitron is a radio audience research company in the United States which collects listener data on radio audiences. Arbitron collects data by selecting a random sample of a population. People in the sample are asked to maintain a written diary describing each radio program listened to. Ratings entities also exist to provide estimates of television audience sizes and newspaper readership.

An advertiser 328 is an entity having an advertising objective. The advertising objective can be to influence people to respond, such as to buy a product, use a service or find out more about a product or service. The advertiser 328 can be an individual, group, company, or advertising agency. The advertiser 328 has information about an advertising campaign such as the type of product or service offered, past performance of the campaign, and target audience.

An advertising system 312 receives information and allocates advertising inventory based on the information. The system 312 can perform analysis of the information and use stored information about broadcasters, the market, and many other factors as part of determining the appropriate allocation. The advertising system 312 can communicate with other systems and entities and include interfaces to receive network, user and other types of inputs. The advertising system 312 can include the response system 302. The advertising system 312 can also be a separate system 312 with connectivity to the response system 302.

The tracked-response module 314 receives information from the response system 302 or is the response system 302. The module 314 can provide the information to the advertising system 312. The module 314 can provide consolidated information for the various modules 304, 306, 308 and 310 of the response system 302.

The billing module 316 bills advertisers. The billing module 316 can accomplish this by communicating with another system. The billing module 316 can also be a billing system 324. The billing module 316 can receive the amount of a charge, the entity to be charged, and other administrative information (e.g., statements of activity and due dates).

The broadcast module 318 communicates with a broadcast entity 322 or is a broadcast entity 322. The broadcast module 318 can be connected to a broadcast entity 322 through a network connection such as a WAN (wide area network) or the Internet. The broadcast module 318 can also be directly connected to a broadcast entity 322 such through a LAN (local area network) or other specialized interface. The broadcast module 318 can provide broadcast content in real-time for broadcast. The broadcast module 318 can also provide broadcast content in advance of the broadcast time. The broadcast module 318 can provide all of the content broadcast by a broadcast entity 322 or only a portion (e.g., only some advertisements).

The advertiser interface 320 is an interface through which the advertiser 328 provides and receives information. The advertiser interface 320 can be an advertiser-facing module. The interface 320 can be a GUI (graphical user interface) or other type of user interface. The interface 320 can be provided through a thin client such as a client-server or Web-based interface. The interface 320 can also be provided through a thick client such as an application running on the advertiser's 328 computer which communicates with the interface 320.

The interface 320 can provide substantially real-time information about the allocation of the advertising inventory by the advertising system 312. Providing the information in substantially real-time can enable an advertiser 328 to adjust advertising settings quickly in response to changing advertising environments.

The comparison module 321 compares the advertising campaigns within the advertising system 312 to determine the appropriate inventory allocation.

The broadcast entity 322 communicates an advertisement to an audience. The broadcast entity 322 can be a radio station, television station, newspaper or other offline media provider.

The billing system 324 charges the advertiser 328 for advertising. The billing system 324 can maintain contact information for advertisers and send bills to advertisers (e.g., through the mail or emails).

In operation, the response system 302 receives audience response information. The information is provided to the advertising system 312. The ratings entity 338 provides rating information to the advertising system 312. The advertiser 328 provides campaign information to the advertising system 312. The advertising system uses the received information to determine how advertising inventory should be allocated. For example, the advertising system 312 can use the ratings information estimate of audience size to predict the number of responses to a campaign using a calculated response rate. The advertising system 312 provides campaign advertisements to the broadcast entity 322. The broadcast entity 322 broadcasts the advertisement which generates the responses tracked by the response system 302. Based on the responses and the price an advertiser 328 has offered to pay for each response, the advertising system 312 can provide information on advertising charges to the billing system 324. The billing system 324 charges the advertiser 328 for the responses (e.g., sending a bill 326 to the advertiser 328 through the mail service).

Figure 4:
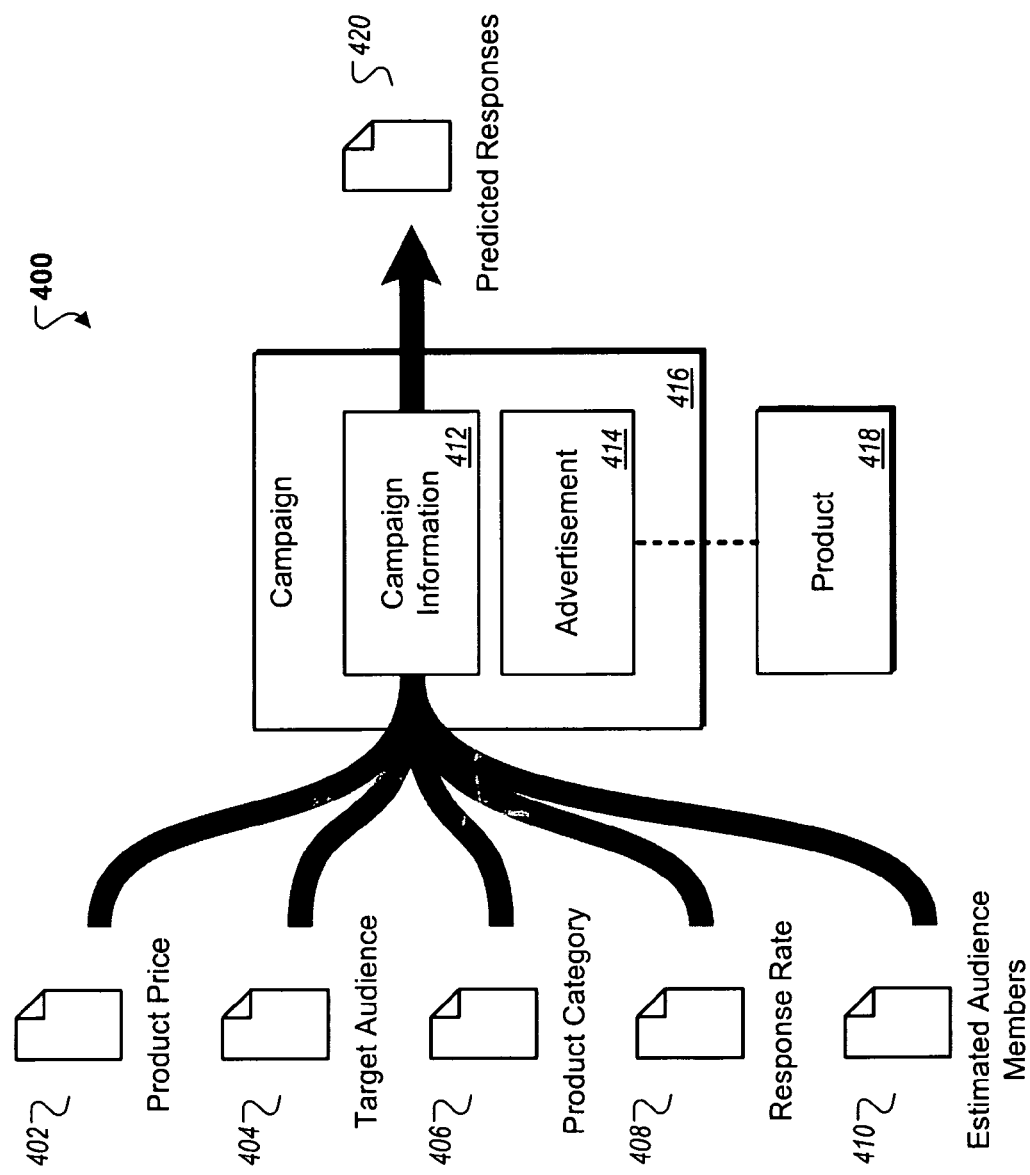
FIG. 4 is a diagram showing exemplary data that can be included in campaign information.

FIG. 4 is a diagram 400 showing the data that can be included in campaign information. When an advertiser requests advertising inventory, information about the advertiser's campaign can be used to predict the number of responses the campaign might expect. The information can be provided by the advertiser, calculated based on other data or provided by third parties.

The campaign 416 is an advertising campaign. The campaign 416 can represent an advertiser's effort to accomplish a particular business objective. For example, the campaign 416 can provide the public with information about a new business that will soon be opening. An advertiser can have multiple campaigns and a campaign 416 can be shared by multiple advertisers.

The campaign information 412 is information describing an advertising campaign. The campaign information 412 can come from different sources, such as the advertiser or third parties (e.g., a broadcast ratings entity). The campaign information 412 can allow a system to predict how the campaign will be received by an audience. The campaign information 412 can include details of one or more of price, target audience and category details of an advertising offering, such as the product 418, of the campaign 416. The campaign information 412 can also include target demographics, product markets (e.g., metropolitan area, DMA, city, zip), time sensitivity of advertising messages, special promotions (e.g., expressed as an advantage over the currently available base product by percentage), historical performance, historical and current performance of similar campaigns (e.g., comparing the campaign information 412 with campaign information of other campaigns such as the potential target audience similarity), trend data and general consumer behavior (e.g., with respect to other media forms such as online, print, TV, radio), market size and market-related information, cyclical nature of offering (e.g., school supplies during fall), hours of operation (e.g., for a call center for phone based responses, or retail store hours), production quality (e.g., audio or video quality) of an advertisement, such as an advertisement 414, differing appeal based on time of day of a broadcast, and content components (e.g., gender of a voice, number of voices, celebrity voice, music, background music) of an advertisement, such as advertisement 414.

The advertisement 414 is a message addressed to an advertiser's objective. The advertisement 414 can be in many different types of media. For example, the advertisement 414 can be a print advertisement, radio advertisement or television advertisement. The advertisement 414 can influence an audience to respond, provide information or both.

The product 418 is something being offered by an advertiser. The product 418 can be a product for sale such as a car or television. The product 418 can also be a service such as dental or travel services.

The predicted responses 420 are the number of responses expected to a campaign 416. For example, the predicted responses 420 can be a number (e.g., 2,000 sales in response to the campaign 416). The predicted responses 420 can also be a rate (e.g., 1% of the listening audience will respond to the campaign 416). The number of predicted responses 420 can be determined when expressed as a rate using information on the audience size the campaign 416 may reach.

In operation, an advertising system can receive campaign information 412, such as a product price 402, a target audience 404, product category 406, past response rate 408 and estimated audience members 410. The campaign information 412 can be used to predict the number of responses 420 to the campaign. For example, if a campaign has a product with a very high relative product price 402, the system can expect a lower number of responses to the campaign 416.

Figure 5:
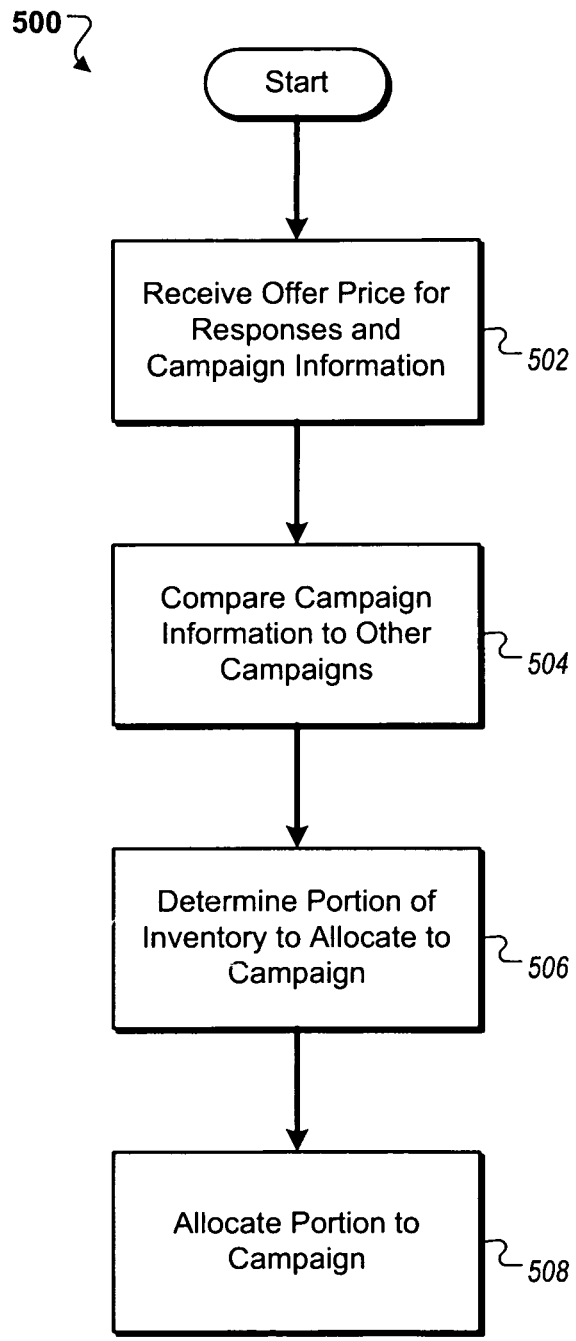
FIG. 5 is a flowchart showing a process for allocating offline advertising inventory.

FIG. 5 is a flowchart showing a process 500 for allocating offline advertising inventory. An advertising system implementing the process 500 can receive information from various advertising campaigns and then determine how to allocate the advertising inventory available to the system to the campaigns.

The process 500, at 502, receives an offer price for responses and campaign information. The offer price can be a price per response. For example, an advertiser can offer $1.00 per product sold in response to a campaign. The process 500, at 502, also receives campaign information discussed in more detail above.

The process 500, at 504, compares the campaign information from a given advertising campaign to other advertising campaigns. For example, part of the campaign information can be a past response rate for the campaign. The process 500 can determine which campaigns are likely to receive the best response rates in the future by comparing the past response rates.

The process 500, at 506, determines what portion of inventory to allocation to a campaign. The determination can be based on the comparing, at 504, by the process 500. Determining what portion to allocate can include considering how profitable each of several potential allocations will be. The determining can also take into account other factors such as saturation of markets and the potential of campaigns to improve over time.

The process 500, at 508, allocates the portion of inventory to the campaign. Allocating the portion can include assigning the portion to the campaign. In this manner, the process 500 can avoid allocating inventory to more than one campaign. In general, inventory can be allocated to one campaign (e.g., one radio advertisement can play at a particular time).

Figure 6:
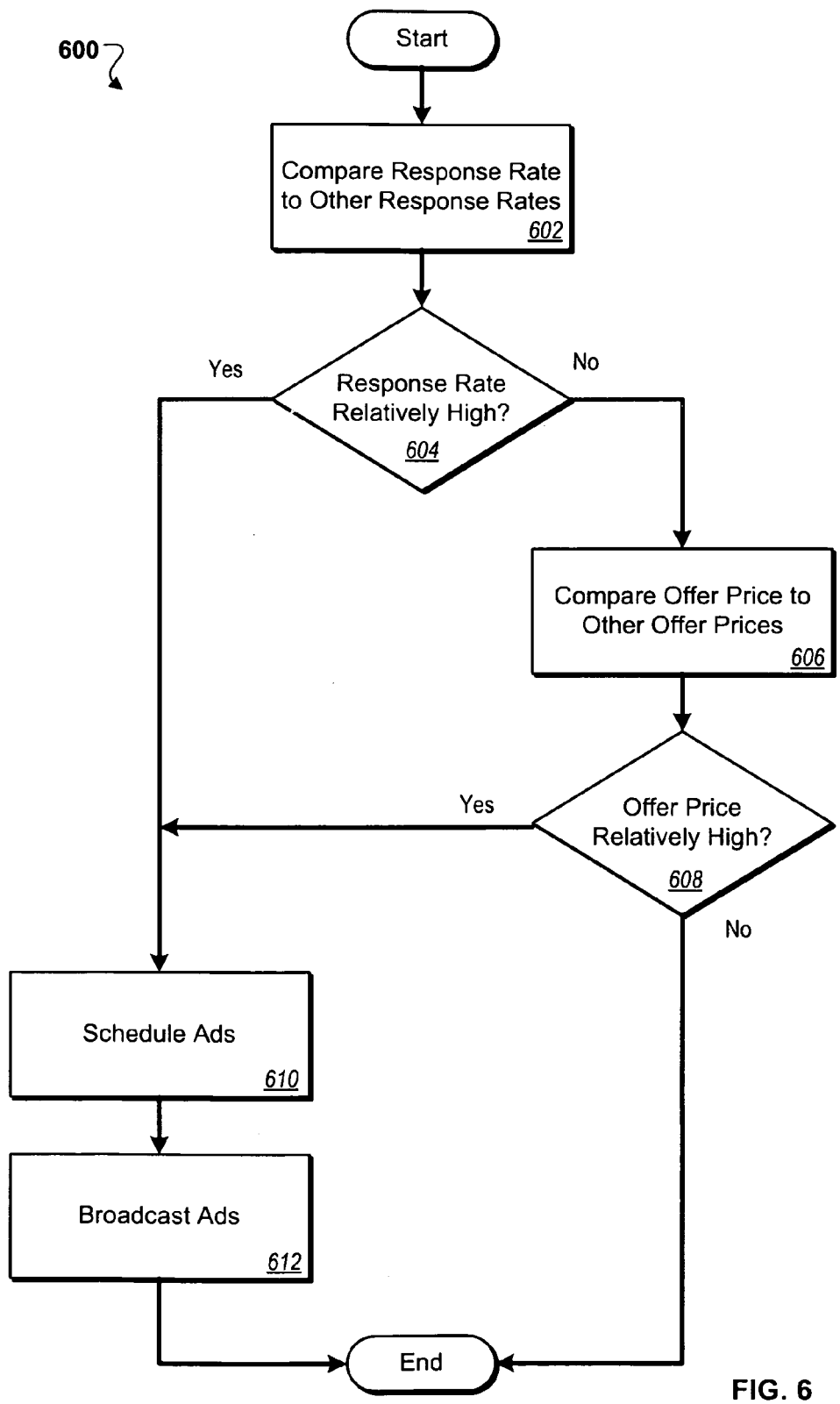
FIG. 6 is a flowchart showing a process for allocating offline advertising inventory.

FIG. 6 is a flowchart showing a process 600 for allocating offline advertising inventory. Advertising inventory can be in demand. To be allocated desired inventory, advertisers can, e.g., offer to pay more or create ads that generate more responses relative to other advertisers. Having such a favorable allocation can facilitate an advertiser's reaching campaign objectives. On the other hand, an allocation not being favorable to an advertiser can involve a campaign not receiving any allocation or a small allocation of inventory. For example, an advertiser can offer to pay less for given inventory than the inventory is worth or than other advertisers are willing to pay. In such a situation, the advertiser's campaign may receive no allocation of inventory.

Advertising campaigns can produce many responses. In a scenario in which an advertiser is charged per response, the value a media provider receives for broadcasting the campaign's advertisements will depend on the number of responses to the campaign. To achieve comparable value for a given portion of inventory from an advertiser expected to receive relatively few responses, the media provider can receive a higher amount per response.

The process 600, at 602, compares an advertising campaign's response rate to the response rate of other campaigns. The process 600 can use the response rate as an indication of what response rate to expect for subsequent allocations of advertising inventory. Based on the comparison, at 602, the process 600 can estimate which campaigns will receive the most responses. At 602, the process 600 can also compare other factors besides response rates such as market saturation (e.g., to avoid playing too many advertisements for car dealerships) and the target audience (e.g., giving preference to advertisers targeting the media provider's particular audience).

The process 600, at 604, determines whether the response rate is relatively high or not based on the comparison, at 602. If the response rate is relatively high, the process 600 can continue by allocating inventory to the campaign. For example, the process 600, at 610, can schedule the campaign ads to play or appear in a particular time slot of a media provider. The process 600, at 612, can broadcast the ads or provide the ads to a media provider for broadcast (e.g., to be played on a radio station).

The process 600, at 604, can determine that the campaign does not have a relatively high response rate compared to other advertising campaigns. In this case, the process 600 continues, at 606, by comparing the campaign's offer price per response to the offer prices of other advertisers. The process 600, at 608, can determine whether the offer price is relatively high and continue, at 610, by scheduling the campaigns ads. If the offer price is not relatively high, the process 600 can end without allocating advertising inventory to the campaign.

The process 600 is an example to demonstrate using both response rates and offer prices in allocating offline advertising inventory. The process 600 can also be implemented so that response rates and response offer prices are considered simultaneously in determining an allocation rather than sequentially, as shown.

Figure 7:
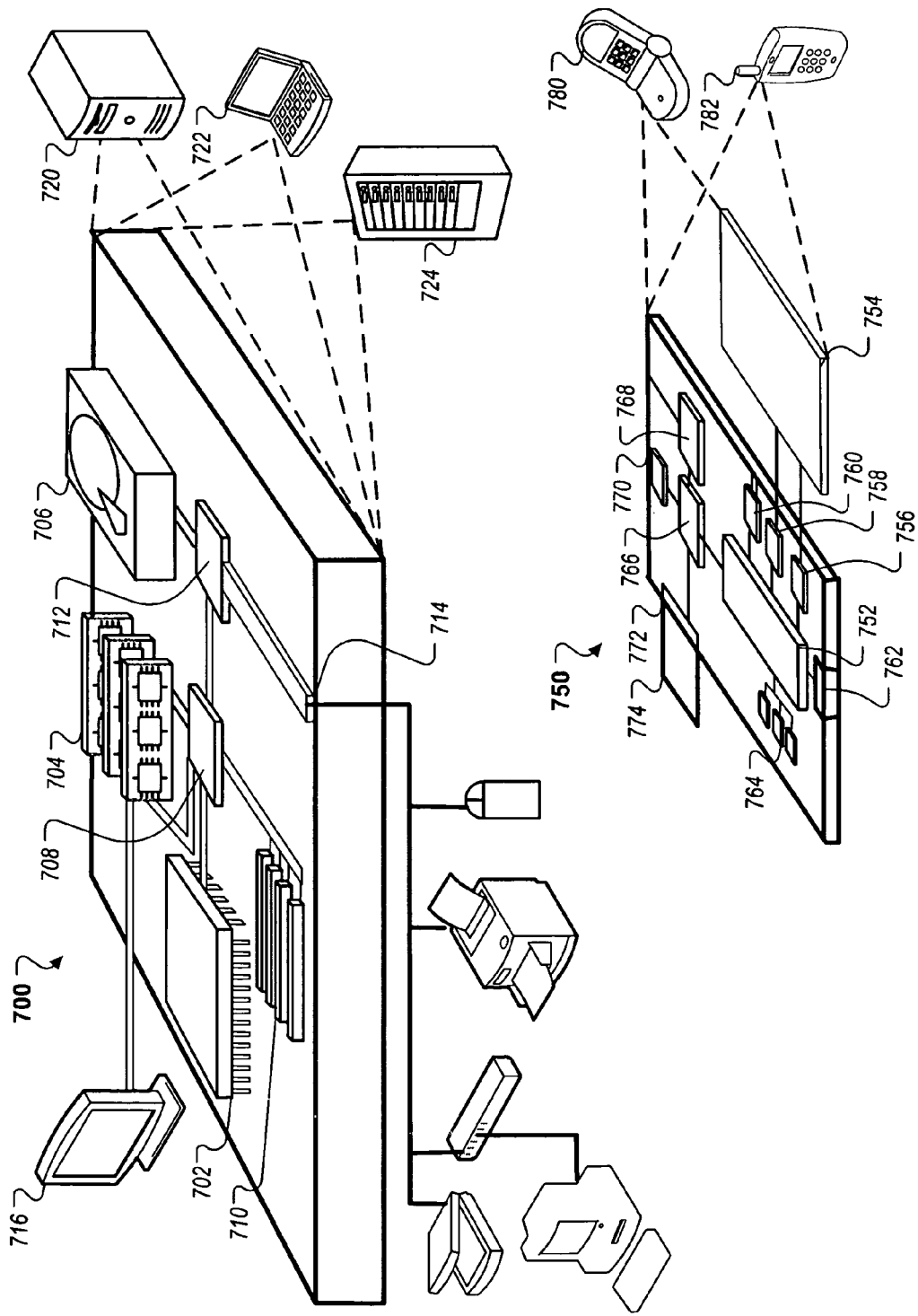
FIG. 7 is a block diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for allocating offline advertising may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more processes executing on a computer system, the method comprising:
   receiving, at an advertiser interface of an advertising system and from an advertiser, a first offer price for audience-member responses for a broadcast advertising campaign and a first collection of campaign information describing the broadcast advertising campaign, the campaign information including a predicted response value for the broadcast advertising campaign;
   comparing, by the advertising system, the received first collection of campaign information and the first offer price to one or more other collections of campaign information each including offer prices and predicted response values for other broadcast advertising campaigns to determine a portion of advertising inventory to allocate to the broadcast advertising campaign;
   allocating, by the advertising system, the determined portion of advertising inventory to the broadcast advertising campaign, wherein the allocating is based at least in part on a combination of the received first offer price and the first collection of campaign information including the predicted response value for the broadcast advertising campaign;
   providing, by a broadcast module of the advertising system, an offline advertisement corresponding to the broadcast advertising campaign to an audience comprising a plurality of audience members, the advertisement having trackable response information and eliciting a trackable response;
   receiving, by a response system configured to receive audience responses to broadcast advertisements from a plurality of mobile devices, a quantity of audience responses generated by the audience members' use of respective ones of the plurality of mobile devices including at least a portion of responses including the trackable response information;
   correlating, by the response system, the portion of responses with the broadcast advertising campaign;
   providing, by the response system and to the advertising system, the audience responses correlated with the broadcast advertising campaign;
   determining, by the advertising system, a response rate for the broadcast advertising campaign based on the audience responses correlated with the broadcast advertising campaign; and
   charging, by the advertising system, the advertiser for the broadcast advertising campaign an amount of money that is based at least in part on the response rate and the first offer price received from the advertiser.

2. The method of claim 1, wherein the received campaign information includes price, target audience, and category details of an advertisement offering of the broadcast advertising campaign.

3. The method of claim 1, wherein the received campaign information includes a past response rate for the broadcast advertising campaign.

4. The method of claim 1, wherein the received campaign information includes at least one of an estimated number of audience members, an estimated age of the audience members, or estimated geographic regions represented by the audience members for the broadcast advertising campaign.

5. The method of claim 1, wherein the audience-member responses include mobile device responses.

6. The method of claim 1, further comprising comparing the first offer price to offer prices of the other broadcast advertising campaigns so that the determined portion is favorable for the broadcast advertising campaign when either the first offer price compares favorably to the offer prices of the other broadcast advertising campaigns or the first collection of campaign information compares favorably to the other broadcast advertising campaigns.

7. The method of claim 6, wherein the determined portion being favorable comprises being beneficial to an objective relating to the broadcast advertising campaign.

8. The method of claim 1, further comprising:
   providing updates, relating to the allocating, through a user interface in substantially real time.

9. The method of claim 1, wherein the broadcast advertising campaign is conducted using one or more of broadcast radio, television or a newspaper.

10. The method of claim 1, wherein the received campaign information includes at least one of target demographics, product markets, product offer information, or consumer market information.

11. The method of claim 4, wherein the estimated number of audience members is further defined by a specific time of day.

12. The method of claim 1, wherein the trackable response information is selected from the group comprising a predetermined telephone number, a predetermined uniform resource locator (URL), a predetermined e-mail address, and a predetermined short messaging system (SMS) message recipient, and the trackable response is selected from the group comprising calling the predetermined telephone number, requesting the predetermined uniform resource locator (URL), sending an email to the predetermined e-mail address, and sending a short messaging system (SMS) message to the predetermined recipient.

13. A computing device comprising a computer program product stored on a non-transitory computer readable medium, the stored computer program product including executable instructions that when executed cause the computing device to perform functions comprising:

receiving, at an advertiser interface of an advertising system and from an advertiser, a first offer price for audience-member responses for a broadcast advertising campaign and a first collection of campaign information describing the broadcast advertising campaign, the campaign information including a predicted response value for the broadcast advertising campaign;

comparing, by the advertising system, the received first collection of campaign information and the first offer price to one or more other collections of campaign information each including offer prices and predicted response values for other broadcast advertising campaigns to determine a portion of advertising inventory to allocate to the broadcast advertising campaign;

allocating, by the advertising system, the determined portion of advertising inventory to the broadcast advertising campaign, wherein the allocating is based at least in part on a combination of the received first offer price and the first collection of campaign information including the predicted response value for the broadcast advertising campaign;

providing, by the advertising system, an offline advertisement corresponding to the broadcast advertising campaign to an audience comprising a plurality of audience members, the advertisement having trackable response information and eliciting a trackable response;

receiving, from a response system configured to receive audience responses to broadcast advertisements from a plurality of mobile devices, a quantity of audience responses generated by the audience members' use of respective ones of the plurality of mobile devices including at least a portion of responses including the trackable response information;

correlating, by the response system, the audience responses with the broadcast advertising campaign;

providing, by the response system and to the advertising system, the responses correlated with the broadcast advertising campaign;

determining, by the advertising system, a response rate for the broadcast advertising campaign based on the audience responses correlated with the broadcast advertising campaign; and charging, by the advertising system, the advertiser for the broadcast advertising campaign an amount of money that is based at least in part on the response rate of audience responses and the first offer price received from the advertiser.

14. The stored computer program product of claim 13, wherein the received campaign information includes price, target audience and category details of an advertisement offering of the broadcast advertising campaign.

15. The stored computer program product of claim 13, wherein the received campaign information includes a past response rate for the broadcast advertising campaign.

16. The stored computer program product of claim 13, wherein the received campaign information includes at least one of an estimated number of audience members, an estimated age of the audience members, or estimated geographic regions represented by the audience members for the broadcast advertising campaign.

17. The stored computer program product of claim 13, wherein the audience-member responses include mobile device responses.

18. The stored computer program product of claim 13, further including executable instructions causing the computing device to perform functions comprising comparing the first offer price to offer prices of the other broadcast advertising campaigns so that the determined portion is favorable for the broadcast advertising campaign when either the first offer price compares favorably to the offer prices of the other broadcast advertising campaigns or the first collection of campaign information compares favorably to the other broadcast advertising campaigns.

19. The stored computer program product of claim 18, wherein the determined portion being favorable comprises being beneficial to an objective relating to the broadcast advertising campaign.

20. The stored computer program product of claim 13, further including executable instructions causing the computing device to perform functions comprising:

providing updates, relating to the allocating, through a user interface in substantially real time.

21. The stored computer program product of claim 14, wherein the broadcast advertising campaign is conducted using one or more of broadcast radio, television or a newspaper.

22. The stored computer program product of claim 13, wherein the received campaign information includes at least one of target demographics, product markets, product offer information, or consumer market information.

23. The stored computer program product of claim 16, wherein the estimated number of audience members is further defined by a specific time of day.

24. The stored computer program product of claim 13, wherein the trackable response information is selected from the group comprising a predetermined telephone number, a predetermined uniform resource locator (URL), a predetermined e-mail address, and a predetermined short messaging system (SMS) message recipient, and the trackable response is selected from the group comprising calling the predetermined telephone number, requesting the predetermined uniform resource locator (URL), sending an email to the predetermined e-mail address, and sending a short messaging system (SMS) message to the predetermined recipient.

25. A system comprising:

an advertising system comprising a first computing device comprising an advertiser interface and a first computer program product stored on a first non-transitory computer readable medium, the first stored computer program product including executable instructions that when executed cause the first computing device to perform functions of:

receiving, at the advertiser interface and from an advertiser, a first offer price for audience-member responses for a broadcast advertising campaign and a first collection of campaign information describing the broadcast advertising campaign, the campaign information including a predicted response value for the broadcast advertising campaign;

comparing the received first collection of campaign information and the first offer price to one or more other collections of campaign information each including offer prices and predicted response values for other broadcast advertising campaigns;

determining a portion of advertising inventory to allocate to the broadcast advertising campaign based on the comparing;

allocating the determined portion of advertising inventory to the broadcast advertising campaign, wherein the advertising inventory is allocated based at least in part on a combination of the received first offer price and the first collection of campaign information including the predicted response value for the broadcast advertising campaign; and providing an offline advertisement corresponding to the broadcast advertising campaign to an audience comprising a plurality of audience members, the advertisement eliciting a trackable response;

a response system comprising a second computing device comprising a second computer program product stored on a second non-transitory computer readable medium, the second stored computer program product including executable instructions that when executed cause the second computing device to perform functions of:

receiving, from a plurality of mobile devices, a quantity of audience responses generated by the audience members' use of respective ones of the plurality of mobile devices including at least a portion of responses including the trackable response;

correlating, by the response system, the portion of responses with the broadcast advertising campaign; and providing, to the advertising system, the audience responses correlated with the broadcast advertising campaign;

wherein the first stored computer program product further causes the first computing device to perform functions of:

receiving, from the response system, the quantity of audience responses;

determining a response rate for the broadcast advertising campaign based on the audience responses correlated with the broadcast advertising campaign; and charging the advertiser for the broadcast advertising campaign an amount of money that is based at least in part on the response rate and the first offer price received from the advertiser.

* * * * *